(12) United States Patent
Ruoff et al.

(10) Patent No.: US 6,220,760 B1
(45) Date of Patent: Apr. 24, 2001

(54) THREE-RING NEEDLE BEARING

(75) Inventors: Gottfried Ruoff, Niederwerrn; Heinrich Hofmann, Schweinfurt, both of (DE)

(73) Assignee: FAG Automobiltechnik AG (DE)

( * ) Notice: Subject to any disclaimer, the term of this patent is extended or adjusted under 35 U.S.C. 154(b) by 0 days.

(21) Appl. No.: 09/351,555

(22) Filed: Jul. 12, 1999

(30) Foreign Application Priority Data

Jul. 10, 1998 (DE) .............................................. 198 30 890

(51) Int. Cl.[7] .................................................... F16C 19/50
(52) U.S. Cl. ............................ 384/447; 384/461; 74/570
(58) Field of Search ................................. 384/447, 461; 74/86, 570; 417/273

(56) References Cited

U.S. PATENT DOCUMENTS

| | | | |
|---|---|---|---|
| 4,861,234 | * 8/1989 | Joy et al. | .............................. 74/570 X |
| 5,234,270 | * 8/1993 | Mathes | ................................. 384/461 |
| 5,632,560 | * 5/1997 | Dittenhofer | ........................... 384/447 |
| 6,078,118 | * 6/2000 | Reinartz et al. | ................. 417/273 X |

FOREIGN PATENT DOCUMENTS 19632167  2/1998 (DE) .

\* cited by examiner

*Primary Examiner*—Thomas R. Hannon
(74) *Attorney, Agent, or Firm*—Ostrolenk, Faber, Gerb & Soffen, LLP

(57) ABSTRACT

A three-ring needle bearing with a central support shaft, a center ring around the shaft, an outer ring around the center ring, and an inner needle array between the shaft of the center ring and an outer needle array between the center ring and the outer ring. An axial disk at one axial end of the bearing push fit on the center ring and radially projecting past both the inner needle array and the outer needle array for axially supporting them. The outer ring having bend-in moldings which past the axial disk at one end and past the end of the outer needle array at the other end. A drive shaft rotates the center ring, which is eccentric with reference to the support shaft.

6 Claims, 1 Drawing Sheet

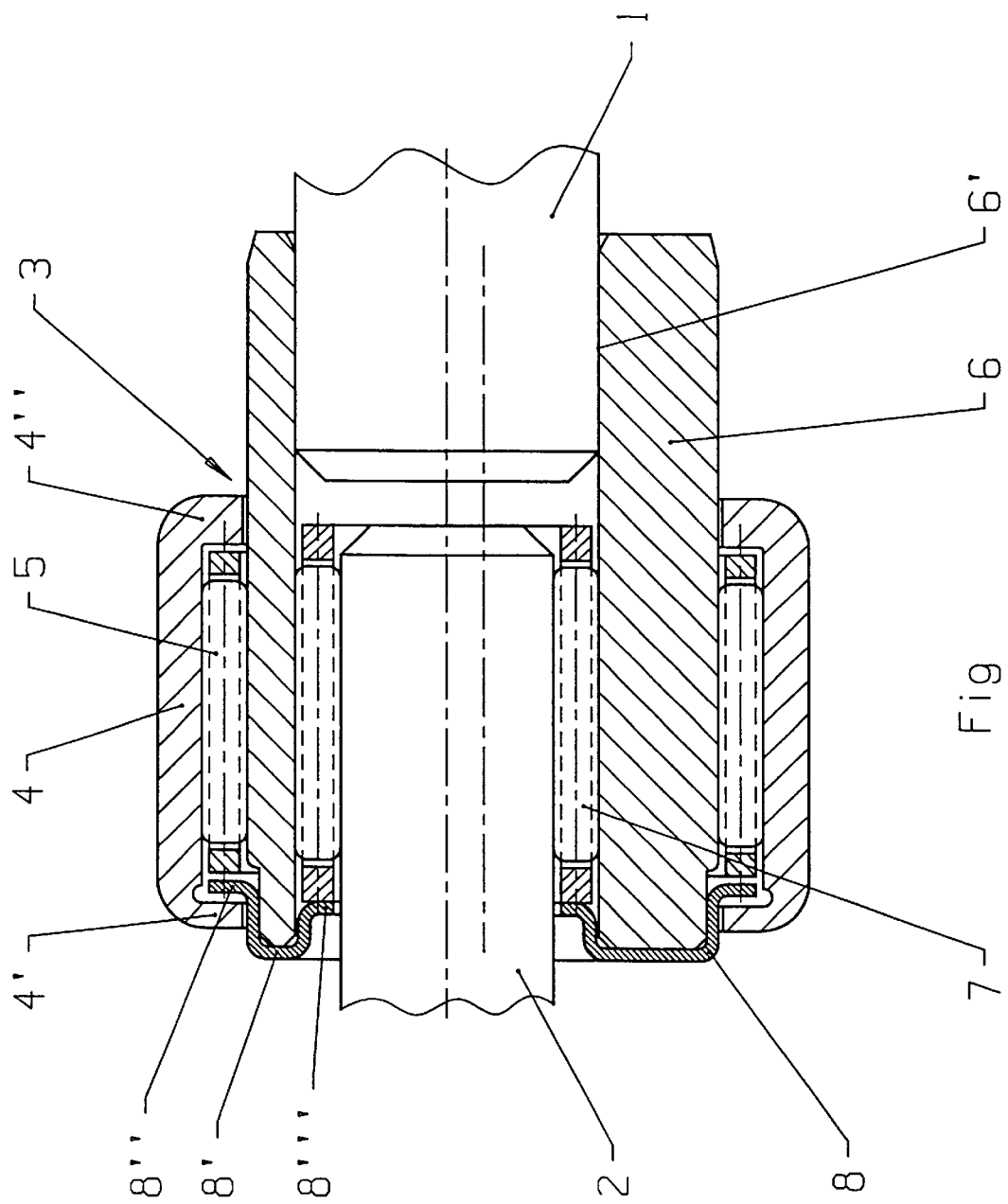

THREE-RING NEEDLE BEARING

BACKGROUND OF THE INVENTION

The invention relates to a three-ring needle bearing having two concentric, radially separated arrays of bearing needles.

A particular application for the three-ring bearing is to convert concentric rotation of a shaft into eccentric orbital motion of a mounting. This has particular application for use in a pump but is not limited for use only in a pump. The eccentric motion is produced by an eccentric ring between the two concentric arrays of needles.

Three-ring bearings are known from DE 196 32 167. However, that bearing unit is highly complex. It is necessary to incorporate a groove in the hole or bore in the eccentric center ring in order to fix the inner needle array axially in the groove.

Furthermore, the axial guides for the needle arrays may present problems. For example, the projection/groove connection between the cage for the inner needle array and the eccentric center ring may be worn. As a result, the inner array cage makes sliding contact on the sickle-shaped free space of the eccentrically designed molding on the outer race. In addition, the outer ring together with the outer needle array are secured axially only in one direction, so that the three-ring bearing can come apart during its installation.

Furthermore, the eccentric center ring must be provided with a threaded section for securing the torque transmission sleeve. The latter sleeve, as well as the mating piece, are equipped with a complex multiple tooth system, which does not axially fix the three-ring bearing with the electric motor.

SUMMARY OF THE INVENTION

The object of the invention is thus to provide a three-ring bearing which does not have the above disadvantages and, in particular, which is comprised of parts which can be manufactured easily, can be assembled easily, and which form a unit.

This object is achieved by producing the three-ring bearing using parts which block undesired axial motion of the bearing ring and the two bearing needle arrays. The bearing includes a central support shaft which is usually stationary. An inner annular needle array of axially extending bearing needles is around the central shaft and uses the central support shaft as an inner race. A rotatable eccentric center ring with a hole or bore through it defines the outer race for the inner needle array and it is also shaped for engaging the drive shaft of a motor, so that the eccentric center ring is rotated to provide orbital motion. An outer annular needle array of axially extending bearing needles is disposed outside the center ring and uses the exterior of the center ring as its inner race. An outer ring which is usually nonrotating is disposed outside the outer needle array and defines the outer ring. That outer ring has moldings at its axial ends for holding the outer needle array axially. Rotation of the drive shaft rotates the center ring, and the bearings enable the center ring to rotate with respect to the stationary central shaft and with respect to the nonrotating outer ring, and the outer ring moves in orbital eccentric motion.

A unit comprised of a plurality of parts is obtained simply by providing a U-shaped axial disk on that axial side of the three-ring bearing that faces away from the drive shaft from the electric motor. The U-shaped center part of the axial disk is seated with a push fit on the eccentric center ring of the bearing. It can thus be easily pushed on axially during assembly. That push fit prevents the parts from becoming loose. The outer ring of the three-ring needle bearing is fixed axially because after the radial projection of the axial disk has been installed, a molding on the outer ring is subsequently bent around, radially inwardly by plastic deformation. The outer ring, the outer needle array and the eccentric center ring thus form a unit which is easy to handle.

To fix the inner needle array axially, the axial disk also has a projection that projects radially inwardly. The cage of the inner needle array makes sliding contact with this projection. The axial disk causes the respective cages of the two needle arrays to make good, wear-free contact with the projections on this disk.

Other objects and features of the invention are explained with reference to the FIGURE which shows a longitudinal section through a three-ring bearing according to the invention, with a drive shaft and supporting shaft.

DESCRIPTION OF THE PREFERRED EMBODIMENT

In the FIGURE, a three-ring needle bearing 3 is disposed between a drive shaft 1 of a motor (not shown) and a supporting shaft 2. The three-ring needle bearing 3 is comprised of a nonrotating, orbital motion outer ring 4, an annular, outer bearing needle array 5 of axially extending bearing needles disposed radially inward of the outer ring, and the outer ring serves as the outer race of the outer needle array, an eccentric center ring 6 having an outer periphery which is the inner race for the outer array 5 and having inner periphery in the hole or bore, and an inner needle array 7 of axially extending bearing needles disposed radially inward of the center ring which rides on the inner periphery of the ring 6 as its outer race and on the shaft 2 as its inner race. The noted eccentricity of the center ring 6 can be seen in the FIGURE where ring 6 is seen thicker on the bottom section and thinner at the top section.

The invention permits the axial disk 8 to be manufactured easily. The axial disk 8 has a U-shaped center part 8' which surrounds the eccentric center ring 6 with a push fit after the disk is simply pushed on axially. These two parts are thus sufficiently connected together.

A unit comprising the parts 4–8, with the outer needle array 5 and the outer ring 4, is achieved in that the outer radially outward projection 8" of the axial disk 8 projects into the space between the molding 4' and the cage of the needle array 5.

To facilitate assembly of this unit, the moldings 4' and 4" are bent radially inward around both axial ends of the needle array 5 after the needle array 5 has been fitted in place. Since the outer ring 4 has a molding 4' and 4" on both axial sides, it is impossible for the needle array 5 to fall out.

The axial disk 8 further has a projection 8''' which projects radially inward. This defines a running part for the inner needle array 7. On the other axial side, the inner needle array 7 is fixed axially by the end face of the drive shaft 1. The drive shaft 1 also produces the connection for the three-ring needle bearing 3 since the shaft is seated with a push fit against the surface 6' in the hole of the eccentric center ring 6.

All the individual parts of the three-ring needle bearing can be manufactured using simple means. Furthermore, the parts can be assembled easily and preferably automatically since, apart from bending the moldings 4', 4" only axial pushing on movements are required. The cages of the needle arrays 5 and 7 are also guided in both axial directions on optimally designed opposing surfaces.

This embodiment itself also produces a unit for the bearing parts, since all the parts are held by the push fit of the axial disk 8 on the eccentric center ring 6 and by the projections 8" and 8. For transportation and handling of the unit, the inner needle ring 7 is provided with fixing (which was still lacking) in the direction of the drive shaft 1 by means of the lubricating grease supplied to the unit.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A three-ring needle bearing comprising a central support shaft, a center ring around the support shaft, the center ring having an eccentric hole through which the support shaft extends and also having an axial end, a drive to the center ring for rotating the center ring around the shaft;

an outer ring outward of and around the center ring;

an inner, bearing needle array between the support shaft and the hole of the center ring;

an outer, bearing needle array between the center ring and the outer ring;

the needle bearing having an axial side; an axial disk at the axial side of the needle bearing, the disk having a generally U-shaped center part which surrounds the axial end of the center ring with a push fit; the disk having a radially outward projection which extends past the outer needle array and having a radially inward projection which extends past the inner needle array for retaining the outer and inner needle arrays axially.

2. The needle bearing of claim 1, further comprising a first radially inwardly directed portion of the outer ring projecting radially inward past the radially outward projection on the axial disk for holding the axial disk and the outer needle array at the axial ring.

3. The needle bearing of claim 2, wherein the outer ring has a second radially inward extending portion on the other axial end of the outer ring from the first radially inwardly extending portion and extending radially past an axial end of the outer needle array for retaining the outer needle array to the outer ring.

4. The needle bearing of claim 3, wherein the first and second radial projections on the outer ring are bendable radially inwardly from the outer ring for extending past the axial ends of the outer needle array.

5. The needle bearing of claim 1, wherein the drive to the center ring comprises a drive shaft connectable to be driven and the drive shaft is connected to the center ring at the side of the needle bearing away from the axial disk.

6. The three-ring bearing of claim 5, wherein the drive shaft is positioned in the hole in the center ring, and the drive shaft defines an axial running surface for the axial end of the inner needle array opposite the axial disk.

\* \* \* \* \*